United States Patent
Nayfeh et al.

(10) Patent No.: US 9,053,849 B2
(45) Date of Patent: Jun. 9, 2015

(54) MAGNETIC AND LUMINESCENT SILICON NANOPARTICLES, SUPERMOLECULES AND FABRICATION METHODS

(75) Inventors: Munir H. Nayfeh, Urbana, IL (US); Zain H. Yamani, Dhahran (SA)

(73) Assignees: NanoSi Advanced Technologies, Inc., Champaign, IL (US); King Fahd University of Petroleum and Minerals (KFUPM), Dharan (SA)

( * ) Notice: Subject to any disclaimer, the term of this patent is extended or adjusted under 35 U.S.C. 154(b) by 858 days.

(21) Appl. No.: 13/237,225

(22) Filed: Sep. 20, 2011

(65) Prior Publication Data

US 2012/0077021 A1 Mar. 29, 2012

Related U.S. Application Data

(60) Provisional application No. 61/386,166, filed on Sep. 24, 2010.

(51) Int. Cl.
| | |
|---|---|
| *B32B 5/16* | (2006.01) |
| *B05D 5/12* | (2006.01) |
| *C04B 35/00* | (2006.01) |
| *C04B 35/04* | (2006.01) |
| *C04B 35/64* | (2006.01) |
| *H01F 1/40* | (2006.01) |
| *B82Y 25/00* | (2011.01) |
| *H01F 1/00* | (2006.01) |

(52) U.S. Cl.
CPC ............... *H01F 1/405* (2013.01); *Y10T 428/25* (2015.01); *B22F 2998/00* (2013.01); *B82Y 25/00* (2013.01); *C22C 2202/02* (2013.01); *H01F 1/0054* (2013.01)

(58) Field of Classification Search
None
See application file for complete search history.

(56) References Cited

U.S. PATENT DOCUMENTS

| | | | |
|---|---|---|---|
| 6,585,947 B1 | 7/2003 | Nayfeh et al. | |
| 6,743,406 B2 | 6/2004 | Nayfeh et al. | |
| 2011/0097416 A1* | 4/2011 | Nguyen et al. | 424/497 |
| 2011/0274832 A1* | 11/2011 | Dai et al. | 427/127 |

OTHER PUBLICATIONS

Kanj, Mazen Y., et al. "Nanofluid Coreflood Experiments in the ARAB-D", SPE-126161-MS, SPE Saudi Arabia Section Technical Symposium, May 9-11, 2009, Al-Khobar, Saudi Arabia, 11 pages.

Rodriguez, Elena, et al., "Enhanced Migration of Surface-Treated Nanoparticles in Sedimentary Rocks", SPE-124418-MS, SPE Annual Technical Conference and Exhibition, Oct. 4-7, 2009, New Orleans, Louisiana, 21 pages.

Skauge, Tormod, et al., "Nano-sized Particles For EOR", SPE-129933-MS, SPE Improved Oil Recovery Symposium, Apr. 24-28, 2010, Tulsa, Oklahoma, 10 pages.

Villamizar, Luis Carlos, et al., "Interfacially Active SWNT/Silica Nanohybrid Used in Enhanced Oil Recovery", SPE-129901-MS, SPE Improved Oil Recovery Symposium, Apr. 24-28, 2010, Tulsa, Oklahoma, 11 pages.

Yu, H., et al., "Transport and Retention of Aqueous Dispersions of Paramagnetic Nanoparticles in Reservoir Rocks", SPE-129887-MS, SPE Improved Oil Recovery Symposium, Apr. 24-28, 2010, Tulsa, Oklahoma, 21 pages.

\* cited by examiner

*Primary Examiner* — Sheeba Ahmed
(74) *Attorney, Agent, or Firm* — Greer, Burns & Crain, Ltd.

(57) ABSTRACT

A magnetic nanosilicon material comprising silicon nanoparticles impregnated with magnetic atoms. This magnetic nanosilicon material has both luminescent and magnetic properties. In certain embodiments of the invention, magnetic nanosilicon material is encapsulated in a polymer or silica sphere to provide a supermolecule. Supermolecules can be used in applications such as but not limited to detection and imaging.

21 Claims, 3 Drawing Sheets

MAGNETIC AND LUMINESCENT SILICON NANOPARTICLES, SUPERMOLECULES AND FABRICATION METHODS

PRIORITY CLAIM AND REFERENCE TO RELATED APPLICATION

This application claims priority under 35 U.S.C. §119 from prior provisional application Ser. No. 61/386,166, which was filed Sep. 24, 2010.

FIELD OF THE INVENTION

A field of the invention is nanoparticles, particularly semiconductor nanoparticles. Example applications include detection and imaging, such as for oil or water exploration or medical imaging.

BACKGROUND OF THE INVENTION

In the oil industry, there are presently no known exploration techniques that can determine accurately how much oil is left behind, and if it is worth going after it. Moreover, often remaining oil is found in scattered, isolated droplets and patches. Oil companies are searching for more advanced and efficient ways to optimize the development of oil and gas fields. Increasing discovery of oil resources as well as increasing recovery in the major producing reservoirs has thus become a significant goal.

To get a closer look at the interior of a well, imaging technologies utilizing sensors that are injected in the well have been proposed. The present inventors have recognized, however, that the material composition of the imaging agent is an important key to the success of this technology. In one standard technology, for instance, developers utilize fluorescent molecule based tags (~1 nm dimension) as a sensor or marker. Particularly, molecular species are injected on one side of the well and recovered at another side. These markers, however, are able to pass through the finest pores in the rock, and thus the technology suffers severely from slow diffusion and exiting. Moreover, molecular species currently used are not chemically stable under the harsh environmental conditions in a mixture of water and oil in the well (e.g., salinity between 10-20%, ph between 7.5 and 8.4), which drastically reduces the survival rate of the tags in the well. The problem is also compounded by the fact that an oil field usually is made up of a large number of sub-fields and wells that are isolated from one another (e.g., at a spacing of ~1 km). Thus, tracers or imaging agents used in large system applications such as underground water or oil reserves suffer from a number of problems, and accordingly the sensing methodology suffers from a number of problems, including: low throughput due to the huge volumes involved and/or complicated porous structures involved, and low optical sensitivity. In the case of polymer-based tracer nanoparticles, there is low optical sensitivity, as the sensitivity of detection or counting of polymer-based particles by optical methods is low because the quantum efficiency of fluorescence/luminescence of polymer is extremely low. There is also poor selectivity, as selective detection is hampered by the fact that the emission of the polymer nanoparticles in the visible overlaps with that of hydrocarbon constituent of the oil.

SUMMARY OF THE INVENTION

Embodiments of the present invention include, among other things, a magnetic nanosilicon material comprising, silicon nanoparticles impregnated with magnetic atoms, providing a diluted magnetic nano semiconductor. The materials used provide the diluted magnetic nanosilicon material or supermolecule with luminescent, thermal, and magnetic properties. Selection of particular magnetic atoms can provide additional properties, such as but not limited to thermal sensing. According to another embodiment of the invention, magnetic nanosilicon material can be encapsulated in a polymer or silica sphere. Such supermolecules can be used in applications such as but not limited to detection and imaging. Additionally, the diluted magnetic nanosilicon can be mixed or attached with magnetic nanoparticles of other material within a single capsule that strengthens the magnetic effect.

BRIEF DESCRIPTION OF THE DRAWINGS

FIG. 2A is an SEM image of capsules dispensed from a colloid and dried under ambient conditions on a silicon wafer, showing spherical particles of diameter in the range as small as 50-100 nm; and FIG. 2B is an SEM image of a control sample without the nanoparticles, predominantly showing rod-like structures.

DETAILED DESCRIPTION

Figure 1:
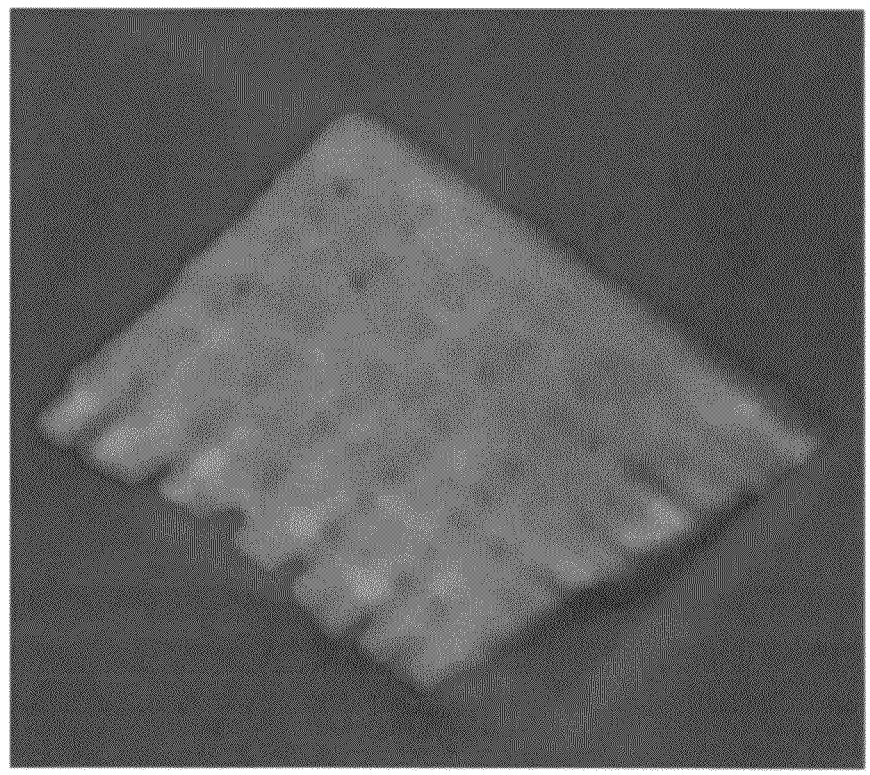
FIG. 1 shows example silicon nanoparticles impregnated with magnetic atoms, where the particles are immobilized on a surface of glass carpets of glass fibers, according to an embodiment of the present invention.

Embodiments of the invention utilize semiconductor nanoparticles that have been magnetized using doping with magnetic material to allow magnetic deflection, collection, concentration, and detection in addition to detection by optical means. These semiconductor nanoparticles allow the use of small volume sampling, yet with accurate characterization and better signal to noise ratio.

An embodiment of the invention is a magnetic nanosilicon material formed by impregnating silicon nanoparticles with magnetic atoms, such as iron (Fe), and/or manganese (Mn). A preferred embodiment fabrication method uses simple wet chemistry with the particles suspended in a solution, though other methods of fabrication are possible.

This new material provides both optical and magnetic functionalities, as well as thermal. The inventive material may be used in stand-alone applications or encapsulated in or coated on other material, such as polymer or silica nanostructures. The material may be used as a dual optical and magnetic in addition to thermal imaging or sensing device, such as but not limited to a probe in underground water or oil fields, as well as in the human body. In particular nonlimiting example embodiments, the presence of erbium dopant provides a thermal functionality that enables the measurement of local environmental temperature. Sensors, tracers, and/or imagers including such magnetic nanosilicon material are provided according to embodiments of the present invention.

There is not believed to previously be in the art a sensor, tracer, or imager based on hydrogenated silicon nanoparticles that are luminescent and thermally sensitive and have been magnetized. These may constitute magnetic silicon supermolecules or diluted magnetic nanosilicon. The number of dopants allowed in such supermolecules may be limited by fundamental molecular structure to one dopant, which makes such example processes clean and the structures well predicted for design purposes.

Diluted magnetic semiconductors (DMS) including silicon have been achieved using doping with magnetic material at a level of a few percent. However, such conventional diluted magnetic semiconductors have been large silicon crystals, not silicon nanoparticles, and they do not exhibit a luminescent or thermal property.

There have been other processes for producing fluorescent magnetic architectures, but these processes do not involve silicon. In one such process, researchers start with superparamagnetic iron oxide (SPIO) nanoparticles. Then, a silanization coating is produced on the surface of the SPIO nanoparticles. This is followed by attaching a fluorescent compound to the silanization coating. In another procedure, Cobalt ferrite magnetic nanoparticles are first produced. The nanoparticies are then coated with a silica shell ($SiO_2$). To acquire additional fluorescent properties, an organic fluorescent dye (rhodamine B isothiocyanate, RITC) is incorporated into the silica shell. In still other methods, vapor depositing of an opaque metal is used to coat one hemisphere of a fluorescent nanosphere. This leaves the second half bare for the purpose of optical transparency to allow fluorescence to come out. The metal may be chosen to be a magnetic material that imparts magnetic sensing.

In still other methods, copolymer nanospheres have been integrated together in two types of nanoparticles: fluorescent semiconductor quantum dots (CdS) (Se) and magnetic gamma-$Fe_2O_3$ nanoparticles to produce tri-functional probes. However, none of these procedures involves modification of a nanoparticle at the molecular level.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

In an example formation method, silicon nanoparticles are impregnated or doped with the magnetic atoms in wet chemistry processes. Silicon nanoparticles are first produced from boron or arsenic doped silicon wafers. Example methods for producing silicon nanoparticles include chemical etching. Particular example techniques are disclosed in U.S. Pat. Nos. 6,585,947 and 6,743,406.

The nanoparticles are suspended in isopropyl alcohol. A salt bearing the magnetic atoms, such as the iron chlorides, e.g., erbium (Er), iron (Fe), and/or manganese (Mn), is then added to the nanoparticle colloid. The liquid is incubated for several hours under darkness condition or can be activated by shining light to allow the positive ions to enter in the nanoparticles to dope them. The impregnated nanoparticles can then be separated from the unreacted salt by gel chromatography.

In another example formation method, the impregnated nanoparticles are separated from the unreacted salt by using solvents, which may place limiting choices on the solvents allowed. To facilitate this separation, certain example methods use solvents in which one species dissolves while the other is unstable to allow precipitation and separation. Thus, a solvent such as acetone is used in which the nanoparticle dissolves fully but the salt is less soluble. The two species are reacted/incubated under agitation or sonication to keep the salt mixed with the nanoparticies. After the reaction is completed the system is put in a static condition to allow the unreacted salt to settle and precipitate. The doped nanoparticles can then be decanted by drawing the liquid out into another container.

Without intending to be limited by theory, there are two ways by which the magnetic atoms may enter the nanoparticles. Example nanoparticles are hydrogenated nanoparticles with a surface of hexagons and pentagon silicon rings. Along the axis of the hexagon, there is a hole in the electronic charge. In this case the ions go through the hexagon ring into the bulk of the particle and reside in the hole by drawing electronic charge and neutralizing much of its positive charge. In this process the ion is inserted electrostatically without breaking any bonds.

The ion may also go through a pentagon. There is no hole in the electron charge along the axis of a pentagon. In this case, the oncoming ion breaks an Si—Si bond of dimers and forms a bridge by sharing the electrons in the bond. These entry and stabilization processes are unique to the example silicon nanoparticles and their electronic structure.

In particular example embodiments using erbium, the dopant atom not only provides magnetic functionality, it provides thermal functionality. For instance, one of the many interesting properties of fluorescence of this example is the strong temperature dependence of the emission from the erbium dopant. The erbium emission lines at 520 nm and 550 nm are close enough in energy such that their intensity ratio depends sensitively on the temperature of the environment. The dependence is governed by the Boltzmann thermal equilibrium law. Thus, by measuring the intensity ratio of the two lines the temperature can be deduced.

In an example procedure using silicon nanoparticles impregnated with magnetic atoms, the particles are immobilized on a surface such as glass carpets of glass fibers, as shown in FIG. 1. The glass fibers can then be easily removed from the salt solution. The carpet can then be re-immersed in a liquid of choice, and the particles can be shaken off in a liquid of choice using ultrasound for later use. In particular example embodiments, silicon nanoparticles are permitted to react with salts bearing Fe or Er, both with particles in solution and immobilized on fiber carpets.

According to another embodiment of the present invention, an example method utilizes wet chemistry to simultaneously produce polymer or silica particles and the encapsulation of a magnetic, thermal and luminescent nanoparticle supermolecule active center. An example procedure according to this embodiment employs polymerization or sol-gel processes. The polymerization and encapsulation is carried out in a single step using a mini emulsion procedure. An example method uses, as a surfactant, Dodecyl benzene sodium sulfonate (SDBS), an anionic surfactant which has strong repulsive electrostatic polar groups. Prior to polymerization, a mixture of aniline and silicon nanoparticles is transparent in room light and shows the characteristic red emission from the nanoparticles under UV irradiation. The overall polymerization process results in a colloid which exhibits a homogeneous light green in room light, characteristic of the color of polyaniline polymer. Under UV light of a wavelength of 365 nm from an incoherent Hg lamp or a wavelength of 330 nm or 440 nm from a HeCd laser the sample shows a red/orange color, characteristic of the luminescence of the silicon nanoparticles.

Figure 2A:
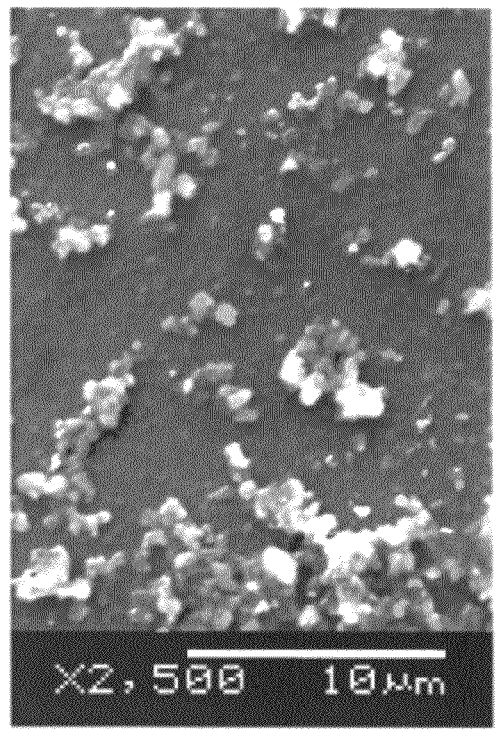
FIGS. 2A-2B are scanning electron microscope (SEM) images, where
Figure 2B:
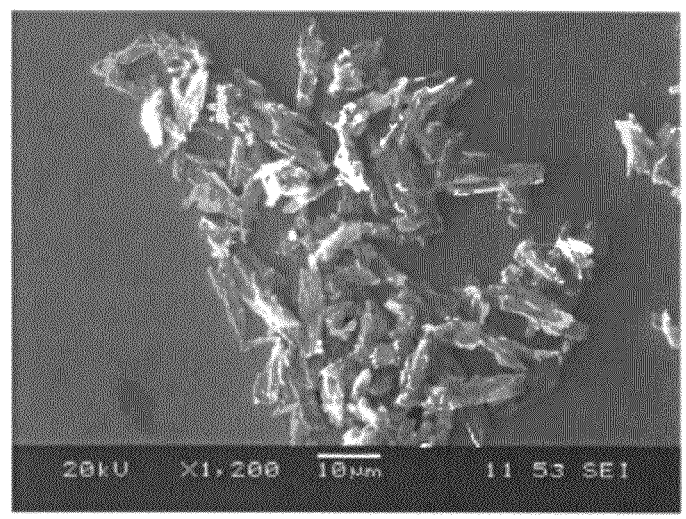

In an experiment according to the above method, some of the capsules were dispensed on device quality silicon wafer. A scanning electron microscope shows the capsules to be spherical particles of diameter ~50-75 nm, as shown in FIG. 2A. Control samples prepared without the presence of the nanoparticles result predominantly in rod-like PANI structures, as shown in FIG. 2B, which points to a process where the particles act as nucleation sites to form spherical structures. Transmission electron microscopy (TEM) of the capsules on a graphite grid shows the nano-capsules to include a dark core of 20 nm across, which is associated with a silicon core, surrounded by a lighter density shell of ~15-20 nm thickness, which is associated with the polymer.

Figure 3:
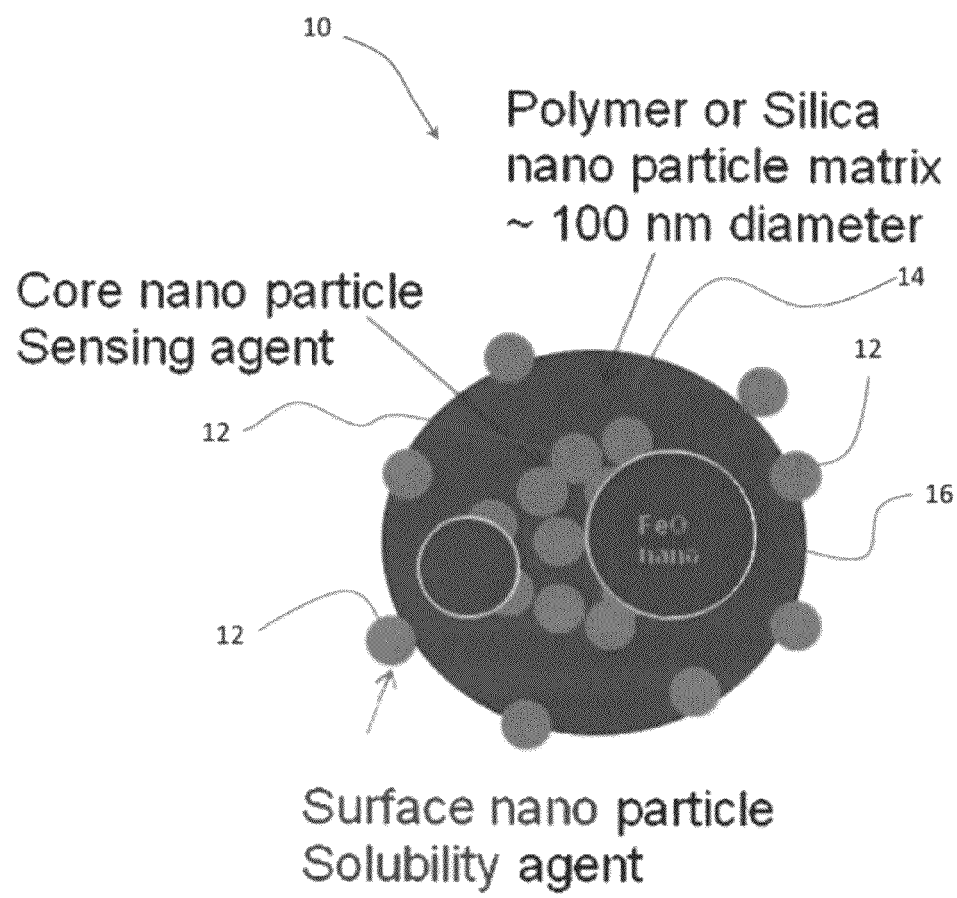
FIG. 3 shows an example nano-probe according to an embodiment of the present invention, including polymer or silica nanoparticles encapsulating active magnetic and luminescent nanoparticles supermolecules.

A general embodiment of a nano-probe 10 is depicted in FIG. 3. The example nano-probe 10 is a composite material of highly luminescent semiconductor nano-material 12 and a polymer (or silica) 14. The polymer 14 is spherical, of diameter of =100 nm. The nanoparticles 12 are embedded inside the sphere 14, on the surface 16, and/or protruding from the surface, and these nanoparticles 12, 14, 16 can be the same or different in composition. Alternatively, ZnO, PbS or other luminescent material which might extend the detection into different parts of the optical spectrum, including but not limited 1.5 to near infrared (IR), might be incorporated, such as by mixing them in the silicon nanoparticle colloid. The capsules may further include a magnetic cluster, such as FeO nanoparticles 18.

Nonlimiting example applications for supermolecules of the present invention include as tracers or sensors for imaging in oil fields, underground water sources, or within the body of an animal, such as a human. In the oil industry, as a nonlimiting example, some researchers have turned to nanotechnology to alleviate problems associated with imaging in oil fields. Polymer nanoparticles have been proposed as fast nano-agents. If successful, it is believed that miniaturized robots that carry the sensing particles may be deployed in the reservoir along with the injected fluids for reservoir in-situ sensing and intervention. Once fully developed, they can provide more accurate reservoir characterization and eventually function as a transport mechanism to alter reservoir properties for more effective production. However, the sensing methodology currently suffers from a number of problems, including: particle agglomeration and aggregation; low optical sensitivity, because the quantum efficiency of polymer is extremely low; and poor selectivity, due to polymer emission overlap with that of hydrocarbons of the oil.

Example supermolecules according to the present invention, such as but not limited to the supermolecule shown in FIG. 3, alleviate some of these concerns. Such supermolecules are highly luminescent and respond thermally and can be made of an average size ~100 nm, which is much larger than molecular sizes, but less than the average pore size of the porous rocks (~1-300 nm). Sensors or tracers provided by such supermolecules can be customized to detect other properties during their journey such as reservoir pressure, temperature, and fluid type, recording the information for collection at the producers.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A magnetic nanosilicon material comprising silicon nanoparticles impregnated with magnetic atoms.

2. The magnetic nanosilicon material of claim 1, wherein the magnetic atoms are selected from the group consisting of erbium (Er) atoms, iron (Fe) atoms, and manganese (Mn) atoms.

3. The magnetic nanosilicon material of claim 1, wherein the silicon nanoparticles comprise hydrogenated silicon nanoparticles having a silicon ring surface taken from the group consisting of hexagons and pentagons.

4. The magnetic nanosilicon material of claim 1, further comprising:
a surface comprising glass;
wherein the magnetic nanosilicon material is immobilized on said surface.

5. A method for forming a magnetic nanosilicon material comprising:
providing silicon nanoparticles in a suspension;
adding a salt bearing magnetic atoms, whereby the silicon nanoparticles are doped by positive ions of the magnetic atoms to provide impregnated nanoparticles and unreacted salt; and
separating the unreacted salt from the impregnated nanoparticles.

6. The method of claim 5, wherein said separating comprises precipitating the unreacted salt.

7. The method of claim 5, wherein said separating comprises separating the by gel chromatography.

8. The method of claim 5, wherein said separating comprises magnetically separating the impregnated nanoparticles from the unreacted salt.

9. The method of claim 5, wherein the suspension comprises isopropyl alcohol;
wherein said provided silicon nanoparticles in a suspension comprise a colloid.

10. The method of claim 5, wherein said adding a salt further comprises:
incubating a liquid including the silicon nanoparticles in the suspension and the salt under darkness.

11. The method of claim 5, further comprising:
immobilizing the impregnated nanoparticles on a surface comprising glass.

12. A supermolecule comprising:
magnetic nanosilicon material according to claim 1 encapsulated in a sphere of polymer or silica particles.

13. The supermolecule of claim 12, further comprising:
additional magnetic nanosilicon material disposed on a surface of the sphere.

14. The supermolecule of claim 12, further comprising:
additional magnetic nanosilicon material protruding from a surface of the sphere.

15. The supermolecule of claim 12, further comprising:
a luminescent material incorporated into the sphere;
wherein said luminescent material extends detection of the supermolecule into near infrared (IR).

16. The supermolecule of claim 12, further comprising:
a cluster of magnetic nanoparticles other than said magnetic silicon material disposed on a surface of the sphere.

17. A method of fabricating a supermolecule, the method comprising:
providing silicon nanoparticles in a suspension;
adding a salt bearing magnetic atoms, whereby, the silicon nanoparticles are doped by positive ions of the magnetic atoms to provide impregnated nanoparticles and unreacted salt;
separating the unreacted salt from the impregnated nanoparticles;
encapsulating a plurality of the impregnated nanoparticles with a polymer or silica sphere to form the supermolecule.

18. The method of claim 17, further comprising:
providing an additional plurality of the impregnated nanoparticles on a surface of the polymer or silica sphere.

19. A sensor, imager, or tracer including the magnetic nanosilicon material of claim 1.

20. A sensor, imager, or tracer including the supermolecule of claim 12.

21. A method of imaging comprising:
   injecting the supermolecule of claim 12 into a porous material;
   measuring a luminescence of the supermolecule.

* * * * *